United States Patent [19]

Ohno

[11] Patent Number: 4,688,930

[45] Date of Patent: Aug. 25, 1987

[54] ORIGINAL READING APPARATUS

[75] Inventor: Akio Ohno, Tokyo, Japan

[73] Assignee: Canon Kabushiki Kaisha, Tokyo, Japan

[21] Appl. No.: 829,902

[22] Filed: Feb. 18, 1986

[30] Foreign Application Priority Data

Feb. 18, 1985 [JP] Japan .......... 60-031124

Oct. 9, 1985 [JP] Japan .......... 60-226570

[51] Int. Cl.[4] .......... G03B 27/32

[52] U.S. Cl. .......... 355/25; 355/24

[58] Field of Search .......... 355/25, 26

[56] References Cited

U.S. PATENT DOCUMENTS 4,098,551 7/1978 Komori et al. .......... 355/26

4,595,286 6/1986 Yamazaki .......... 355/25

FOREIGN PATENT DOCUMENTS 161559 12/1981 Japan .......... 355/25

*Primary Examiner*—Monroe H. Hayes

*Attorney, Agent, or Firm*—Fitzpatrick, Cella, Harper & Scinto

[57] ABSTRACT

An original reading apparatus capable of scanning separately a first area and a second area of an original to be reproduced, includes an original supporting table for supporting thereon an original having the first area and the second area; a scanner for optically scanning the original placed on the original supporting table, wherein the first area and the second area is in series in a direction of a scan of the scanner; driver for driving the scanner selectively in a first mode wherein the scanner first scans the first area of the original and automatically and sequentially scans the second area of the original and in a second mode wherein the scanner first scans the second area of the original and automatically and sequentially scans the first area of the original; and a selector for selecting one from the first mode and the second mode.

5 Claims, 10 Drawing Figures

ORIGINAL READING APPARATUS

FIELD OF THE INVENTION AND RELATED ART

The present invention relates to an original reading apparatus, more particularly to an original reading device wherein a first area and a second area of an original can be separately scanned and read, respectively.

In a copying apparatus, for example, an original placed on an original supporting table or carriage is scanned in the range corresponding to the size of the original, and the copy corresponding to the scan is produced. Recently, there is one type of copying apparatus wherein, as shown in FIG. 4, two pages of an opened book of A4 or B5 size (Japanese Industrial Standard) are placed face down on an original supporting table 2 (the original to be copied is virtually a double size, i.e., A3 or B4 size; and as shown in FIG. 4A, a scanner 7 having an illumination lamp 5 and a movable reflecting mirror 6 scans first the A page (the lefthand side as seen in FIG. 4A) in the range from an X position to a Y position as shown in FIG. 4A. The scanned image is transmitted to an image forming means not shown by way of a movable reflecting mirror 9 which moves at a speed of one half that of the scanner 7 and through a fixed lens 10, and a copy image of that page is produced on an A4 or B5 size copy sheet. Subsequently, as shown in FIG. 4B, the scanner 7 scans the righthand page (B page) from a Y' position to a Z position, and the image forming means forms a copy of the righthand side page on either the back side of the same copy sheet or another copy sheet having the same size.

As will be understood, the copying apparatus of this type produces a copy of the A page (lefthand side) and then produces, a copy of the B page (right-hand side) with one copy command. This one command operation is satisfactory when a book which is bound at its right edge as in a traditional Japanese book, (see FIGS. 5A and 5B) because the operator may simply place the opened book on the original supporting table with the top side of the pages remote from the operator and the bottom side of the pages near the operator. By positioning the opened book in this way, the lefthand side page (A page) has a smaller page number, so that the copying operation is performed in the order of the pages, and therefore, the order of the copied pages discharged on the discharge tray is the same as the order of the pages of the book. However, when a book is bound at its left side as in western style book as shown in FIG. 5C, it is required that the opened book has to be placed upside down on the original supporting table as shown in FIG. 5D. However, the placing in this way is not natural from standpoint of the human engineering. If the western style book is erroneously placed in the orientation as shown in FIG. 5B, the order in which the copying operation proceeds is opposite to the order of the two pages, with the result that the order of the pages of the copy discharged onto the tray is, for example, 2, 1, 4, 3, 6, 5. Accordingly, it is necessary to sort the copied products in the order of the pages of the original after the copying operation.

SUMMARY OF THE INVENTION

Accordingly, it is a principal object of the present invention to provide an original reading apparatus by which a book original is easily copied.

It is another object of the present invention to provide an original reading apparatus whereby an opened book original, whether it is a right-side bound book or a left-side bound book, can be placed on an original supporting table in the natural orientation, without disturbing the order of the pages of the copied products.

According to an embodiment of the present invention, the objects are achieved by providing an original reading apparatus wherein a first area and a second area of the original is scanned separately, said apparatus comprising an original supporting table for supporting an original to be copied, optical scanning means for optically scanning an original, driving means for driving the optical scanning means in a first scanning mode wherein said optical scanning means first scans the first area of the original and automatically scans sequentially the second area of the original, and in a second mode wherein said optical scanning means first scans the second area of the original and automatically scans the first area of the original; and means for selecting a mode of scanning operation from said first and second modes.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
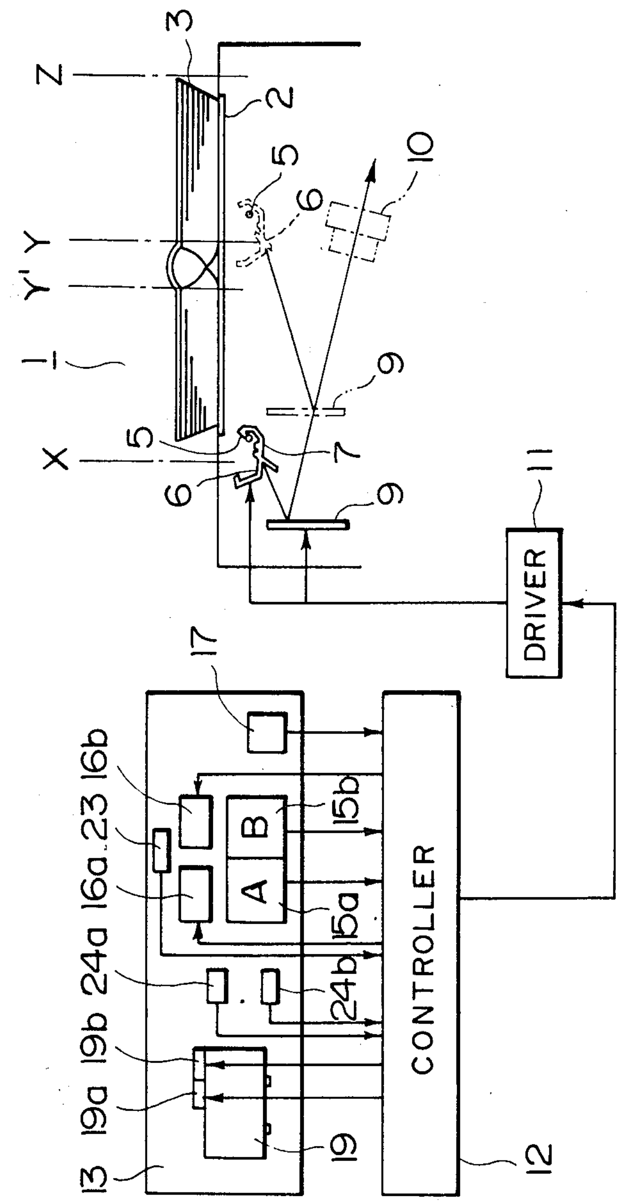
FIG. 1 illustrates an original reading apparatus according to an embodiment of the present invention, wherein the reading apparatus is somewhat schematically shown, and the control system thereof is diagrammatically shown.

Referring now to FIG. 1, there is shown an original reading apparatus according to an embodiment of the present invention. The original reading apparatus 1 is designed to be capable of producing a copy or copies of an original 3 to be copied which is shown as a book original. The apparatus comprises an original supporting table 2, in the form of a transparent platen in this embodiment, for supporting the original 3 thereon, and a scanner 7 including a lamp 5 for illuminating the original 3 through the supporting table 2 and a reflecting mirror 6 which receives the light reflected by the original 3. The scanner 7 is movable as a unit when it scans the original. The light received by the mirror 6 is directed to another reflecting mirror 9 which is movable at a speed one half that of the speed of movement of the scanner 7 and in the same direction as the scanner 7. The light reflected by the mirror 9 is directed to an unshown image forming station through an imaging lens 10. The imaging station may comprise known image forming means, such as electrophotographic copying means. The movable scanner and the movable mirror 9 are driven by a driver 11. The driver 11 is controlled by an output produced by a controller 12 which is a microcomputer in this embodiment.

In this embodiment, when the controller 12 instructs one copying (scanning) operation, the scanner 7 moves while scanning the original 3 from a position indicated by a reference X to a position indicated by a reference Y; thereafter, the scanner 7 slightly moves back to a position indicated by a reference Y'; it moves while scanning from the Y' position to a position indicated by a reference Z. This operation is effected in a first mode of the scanning operation.

The apparatus is operable in a second mode wherein the scanner 7 moves while scanning from the Y' position to the Z position; and returns to the X position; and thereafter, it moves while scanning therefrom to the Y position. The modes of the operations are selectable by selectively depressing selecting keys 15*a* and 15*b*. The selection is transmitted to the controller 12. The selecting keys 15*a* and 15*b* are provided on an operating panel 13 at a top side of the copying apparatus near the operator.

Figure 2:
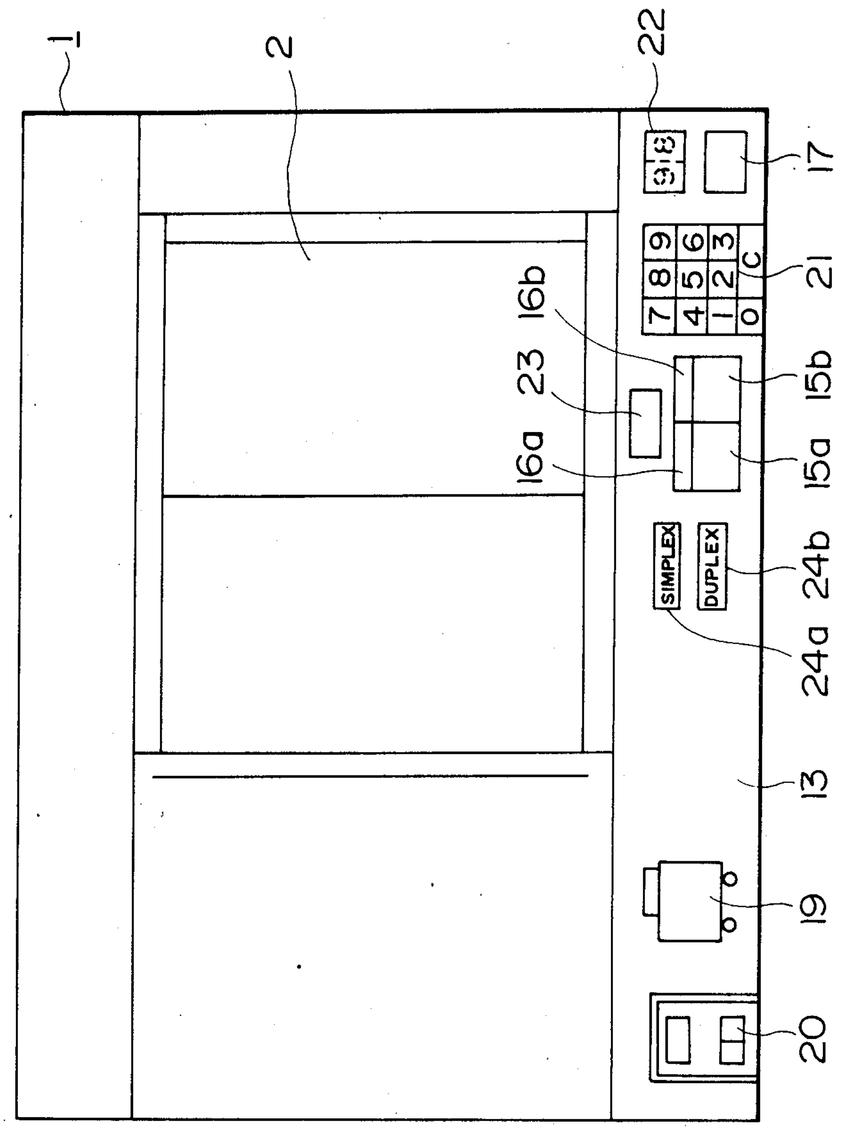
FIG. 2 is a plan view for illustrating an example of an operation panel of the copying apparatus incorporating the embodiment of the present invention.
Figure 3:
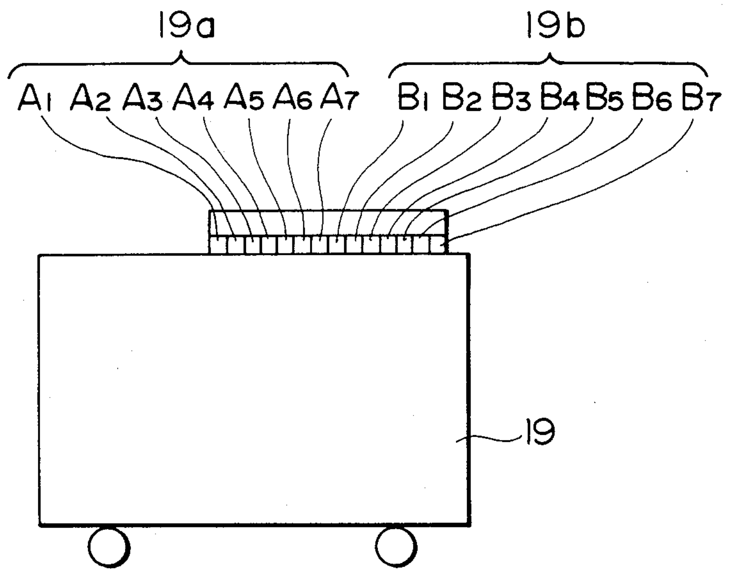
FIG. 3 is a somewhat schematic view of the apparatus illustrating an example of operation displaying means.

When one of the scanning or copying modes is selected at the controller 12, a confirmation signal is produced by the controller 12 in response thereto, whereby one of selection confirmation lamps 16*a* and 16*b* is turned on in accordance with the selection. When the copying apparatus 1 starts its copying operation upon actuation of a starting key 17, the controller 12 produces a signal indicating which (left or right) side of the original 3 is being scanned by the scanner (and this is indicated in a display 19 disposed in the operating panel 13). The display 19 may be in the form of display means 19*a* and 19*b* as shown in FIG. 3, having a plurality of light emitting elements A1–A7 and B1–B7. Because of this, the operator is informed of which side of the opened book original 3 is being scanned by the scanner 7. In place of the display means 19*a* and 19*b*, the mode setting confirmation lamps 16*a* and 16*b* may be flashed by a signal transmitted from the controller 12. With this arrangement, it is also possible that the operator is informed of which side of the opened book original 3 is being scanned by the scanning means 7 as shown in FIG. 2, the copying apparatus 1 further includes a main switch 20 of the copying apparatus, ten keys 21 for setting a number of copies to be produced, a display panel 22 for displaying the selected number of copies to be produced, a key 23 for selecting a mode wherein two opened pages of a book original are to be copied continuously. The apparatus further comprises a key 24*a* for selecting a simplex copy mode wherein a copied image is produced on one side of a copy sheet, and a key 24*b* for selecting a duplex copy mode wherein copied images are produced on the respective sides of the copy sheet.

Operation of the apparatus will be described in conjunction with the flow chart shown in FIG. 6.

When the main switch 20 of the copying apparatus is actuated, the entire system is reset at step 101 so as to place the apparatus in a copy startable state, wherein the copying operation is enabled. Before this state is reached, the system waits (step 102).

Then, the discrimination is made as to whether or not the switch 23 for selecting two-page continuous copy mode is actuated, and if so, the light emitting element (LED) 16*a* and 16*b* are flashed; and the apparatus waits for the operator to designate the A-page-first mode or the B-page-first mode, at step 103. When the switch 15*a* is depressed so that the A-page-first mode is selected, the light emitting element 16*a* flashes, while the other light emitting element 16*b* turns off (steps 105 and 108).

When, on the contrary, the switch 15*b* is depressed so that the B-page-first mode is selected, the light emitting element 16*b* flashes, while the light emitting element 16*a* turns on (steps 106 and 109).

By this, the operator is able to confirm the mode actually set, that is, whether the A-page-first mode or B-page-first mode is selected.

Figure 6:
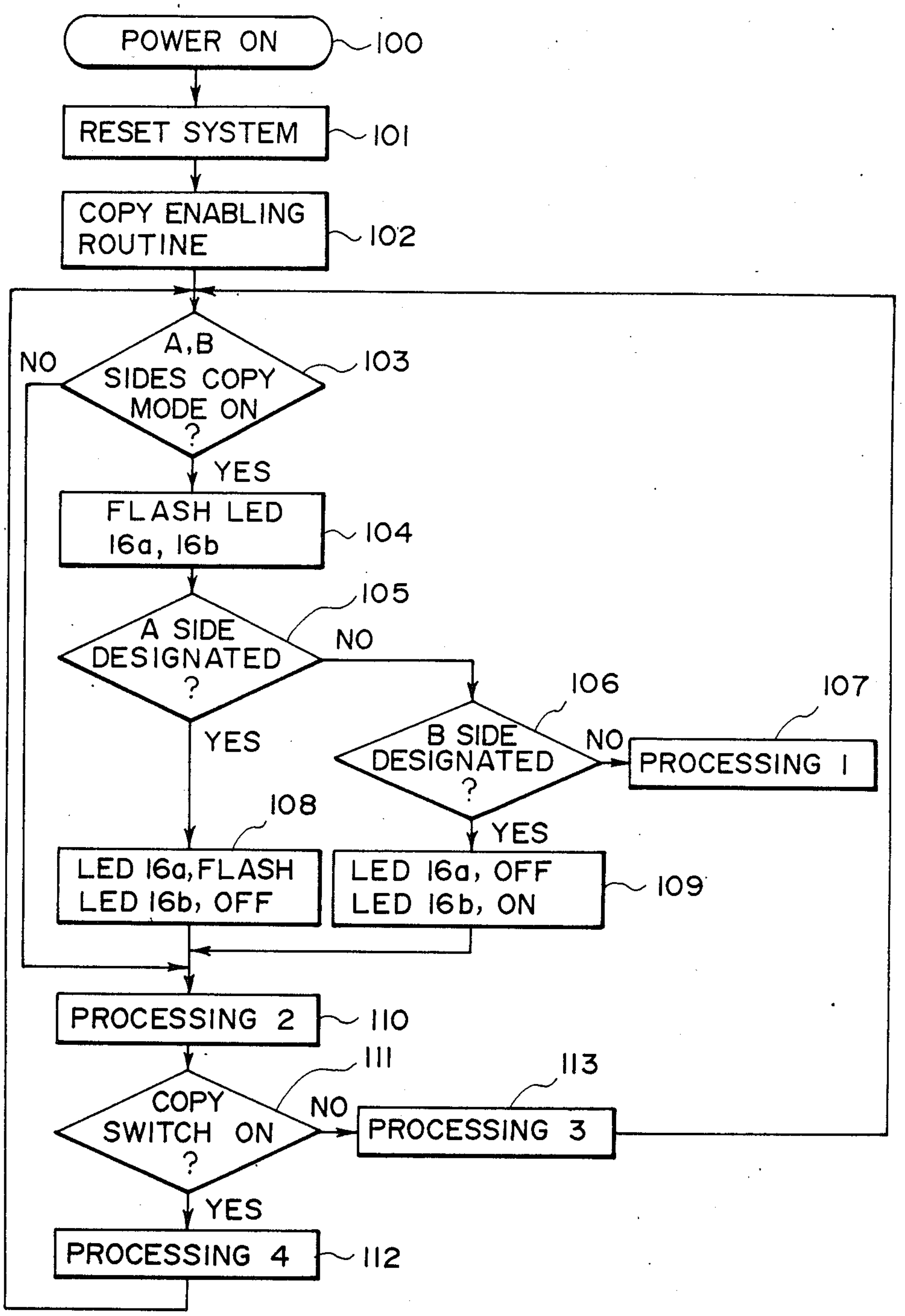
FIG. 6 is a flow chart illustrating operation of the original reading apparatus according to the embodiment of the present invention.

When neither of the mode selection switches is depressed notwithstanding the fact that the switch 23 is depressed, an error disposal routine is effected by a processing 1 as shown in FIG. 6 (step 107).

After the selection of the mode, cassette selecting operation and copy magnification setting operations or the like are performed, and then the system waits for the copy switch to be actuated.

If the copy switch is not actuated within a period of a predetermined time after the above operations, the system is reset by the processing 3, at step 113.

When the copy switch 17 is actuated, the copying sequence is executed by the processing 4. In this processing, the copy ,forming sequence in the simplex or duplex mode whichever is selected by the key 24*a* or 24*b* is executed from the state shown in FIG. 4A if the A-page-first mode has been selected, or from the state of FIG. 4B if the B-page-first state is selected.

Figure 5A:
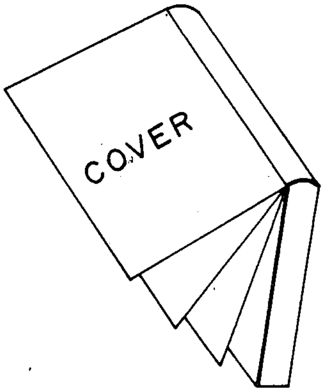
FIG. 5A is a perspective view of a book original which is bound at its right side.
Figure 5B:
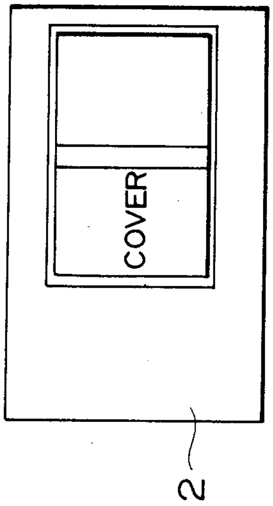
FIG. 5B is a plan view wherein the book shown in FIG. 5A is placed on an original supporting table.
Figure 5C:
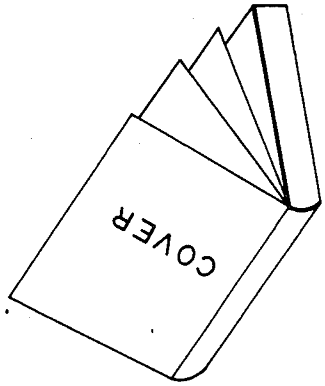
FIG. 5C is a perspective view of a book original bound at its left side.
Figure 5D:
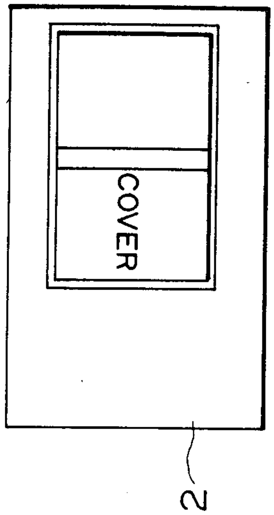
FIG. 5D is a plan view wherein the book shown in FIG. 5C is placed on an original supporting table upside down.

Prior to this, a left-side-bound book as shown in FIG. 5C, for example, is opened and placed face down on the original supporting table 2 of the copying apparatus 1 at a predetermined position in the natural orientation, that is, the top side of the page is positioned remote from the operator, while the bottom side of the page is positioned near the operator.

In the case where the key 15*b* is depressed (the B-page-first mode), the controller 12 controls the original reading apparatus and the copying apparatus 1 so that the scanning operation starts from the righthand (as seen in the Figure) page (B page) of the book original 3. More particularly, the controller 12 produces a driving signal to shift the scanner 7 to the Y' position where the scanning operation starts for the righthand page, and also the controller 12 produces a signal to flash the confirmation lamp 16*b*, thus indicating to the operator that the copying apparatus 1 is set under the condition that the righthand page of the book original 3 is first copied.

When the copy start key 17 is depressed, the scanner 7 moves from the position Y' to the position set to scan the righthand page. The scanned image of the original is transmitted to the unshown image forming station by way of the reflecting mirror 9 moving at a speed one half of that of the scanning means 7 and through a stationary lens 10, and a copy of righthand page of the book original 3 is produced on a copy sheet. The scanning operation for the right page by the scanner 7 is displayed by the display means 19b wherein the light emitting elements B1–B7 sequentially turns on, or by the confirmation lamp 16b flashing.

After the completion of the copying operation for the righthand page, the scanner 7 automatically starts scanning the lefthand side page (A page) by moving from the position X to the position Y. When the duplex copy is selected, the image forming station forms a copy image of the lefthand page on the other side of the same copy sheet on which the righthand page of the original is copied; or when the simplex copy mode is selected, the copy image of the lefthand page of the book original 3 is produced on another copy sheet. Similarly to the foregoing, the scanning operation of the scanner for the lefthand page, is indicated by the display 19a wherein the light emitting elements A1–A7 is sequentially turned on, or by the confirmation lamp 16a flashing.

When a desired number of pages of the book original 3 have been copied, the copy sheets discharged on the tray are in the order of the pages of the original.

When a plurality of copies is to be taken from the same page, a known sorter or the like may be employed, and when a simplex copy is effected, the copy sheets are discharged to the tray through a known reversing device.

Figure 4A:
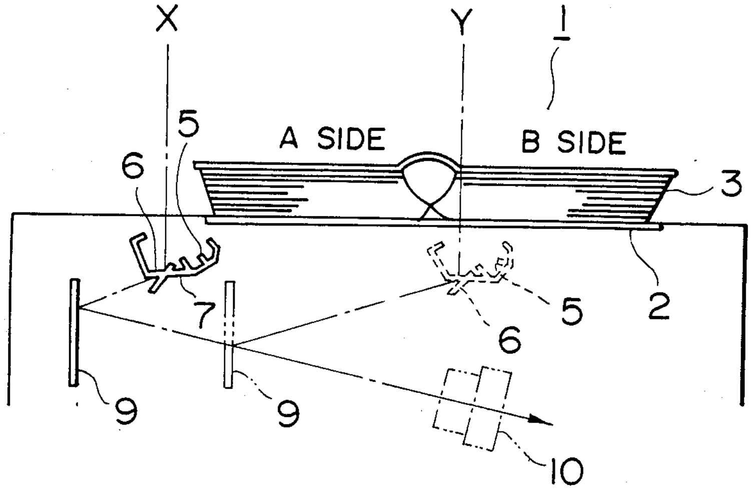
FIGS. 4A and 4B are sectional views illustrating the positional relations between the original and the scanning means.
Figure 4B:
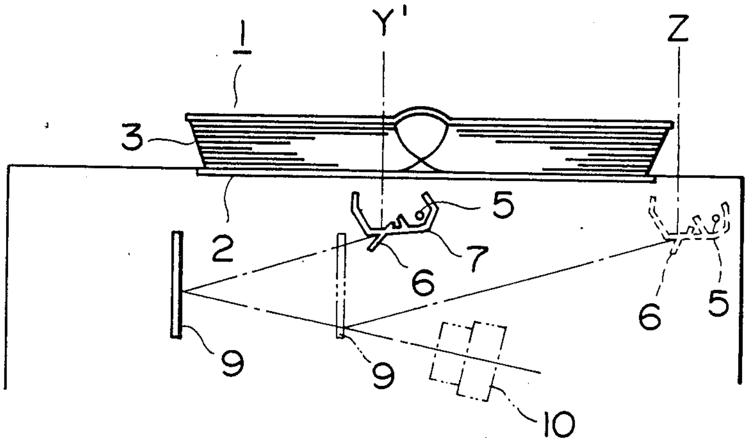

The operation in the A-page-first mode is the same as described with respect to FIG. 4A and FIG. 4B.

As will be understood, in the foregoing embodiments, the copying apparatus 1 is able to take a copy from the lefthand page of the original or from the righthand page of the book original, and there is provided mode selection switches 15a and 15b so that the copying operation can selectively start from the lefthand page or from the righthand page. Therefore, the opened book original 3 is allowed to be placed on the original supporting table 2 in the natural orientation without disturbing the order of the pages of the copies, irrespective of which side the book original is bound. Additionally, in the apparatus according to the embodiment, the mode selection confirmation means 16a and 16b are provided in the operation panel 13, so that which mode(A-page-first mode or the B-page-first mode) is displayed. Therefore, the operator is able to readily confirm visually whether the copying apparatus 1 is correctly performed so that the left-side-bound book, for example, is being copied from the righthand page of the opened original 3 on the original supporting table 2. Furthermore, the operation panel 13 includes the operation display means 19 which displays which page of the original is being copied by the copying apparatus 1 during its copying operation. By this, the operator is able to readily confirm that the copying apparatus 1 operates in the manner that that operator desires. If it is not as it should be, the operator is able to correct the operation.

While the invention has been described with reference to the structures disclosed herein, it is not confined to the details set forth and this application is intended to cover such modifications or changes as many come within the purposes of the improvements or the scope of the following claims.

What is claimed is:

1. An original reading apparatus capable of scanning separately a first area and a second area of an original to be reproduced, comprising:

an original supporting table for supporting thereon an original having the first area and the second area;

scanning means for optically scanning the original placed on said original supporting table, wherein the first area and the second area are in series in a direction of a scan of said scanning means;

driving means for driving said scanning means selectively in a first mode wherein said scanning means first scans the first area of the original and then automatically and sequentially scans the second area of the original and in a second mode wherein said scanning means first scans the second area of the original and then automatically and sequentially scans the first area of the original; and selector means for selecting between the first mode and the second mode.

2. An original reading apparatus capable of scanning separately a first area and a second area of an original to be reproduced, comprising:

an original supporting table for supporting thereon an original having the first area and the second area;

scanning means for optically scanning the original placed on said original supporting table, wherein the first area and the second area are in series in a direction of a scan of said scanning means;

driving mean for driving said scanning means selectively in a first mode wherein said scanning means first scans the first area of the original and then automatically and sequentially scans the second area of the original and in a second mode wherein said scanning means first scans the second area of the original and then automatically and sequentially scans the first area of the original;

selector means for selecting between the first mode and the second mode; and means for displaying which mode is selected by said selector means.

3. An apparatus according to claim 1 or 2, wherein said driving means is able to drive said scanning means in an additional mode wherein the first area and the second area are continuously scanned by a single scanning operation without interruption, and wherein said selector means is able to select the additional mode.

4. An apparatus according to claim 1 or 2, wherein said display means displays a position where said optical scanning means is operating.

5. An apparatus according to claim 1 or 2, wherein said original reading apparatus is provided in a copying machine.

* * * * *

UNITED STATES PATENT AND TRADEMARK OFFICE
CERTIFICATE OF CORRECTION

PATENT NO. : 4,688,930 Page 1 of 2

DATED : August 25, 1987

INVENTOR(S) : AKIO OHNO

It is certified that error appears in the above-identified patent and that said Letters Patent is hereby corrected as shown below:

AT [57] IN THE ABSTRACT

Line 7, "is" should read --are--.
Line 15, "one from" should read --between--.

COLUMN 3

Line 54, "7 as" should read --7. As--.

COLUMN 4

Line 35, ",forming" should read --forming--.
Line 39, "state" should read --mode--.

UNITED STATES PATENT AND TRADEMARK OFFICE
CERTIFICATE OF CORRECTION

PATENT NO. : 4,688,930

DATED : August 25, 1987

INVENTOR(S) : AKIO OHNO

It is certified that error appears in the above-identified patent and that said Letters Patent is hereby corrected as shown below:

COLUMN 5

Line 2, "turns" should read --turn--.
Line 16, "is" should read --are--.
Line 52, "that that" should read --that the--.

Signed and Sealed this

Twenty-fourth Day of May, 1988

Attest:

DONALD J. QUIGG

*Attesting Officer* *Commissioner of Patents and Trademarks*